(12) United States Patent
Reith et al.

(10) Patent No.: US 11,167,673 B2
(45) Date of Patent: Nov. 9, 2021

(54) VEHICLE SEAT

(71) Applicant: Faurecia Automotive Seating, LLC, Auburn Hills, MI (US)

(72) Inventors: Carsten Reith, Niedernwohren (DE); Claudia Worlitz, Hannover (DE); Ludger Oel, Auburn Hills, MI (US); Detlef E. B. Ricken, Langenlonsheim (DE); Michael Windhorst, Rahden (DE); Anne-Sophie Cabouillet, Boissy-le-Sec (FR)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 218 days.

(21) Appl. No.: 16/043,705

(22) Filed: Jul. 24, 2018

(65) Prior Publication Data

US 2019/0031061 A1 Jan. 31, 2019

Related U.S. Application Data

(60) Provisional application No. 62/536,798, filed on Jul. 25, 2017.

(51) Int. Cl.
*B60N 2/56* (2006.01)
*B60N 2/00* (2006.01)

(52) U.S. Cl.
CPC .......... *B60N 2/5685* (2013.01); *B60N 2/002* (2013.01); *B60N 2/5635* (2013.01)

(58) Field of Classification Search
CPC .... B60N 2/002; B60N 2/5635; B60N 2/5642; B60N 2/565; B60N 2/5685
USPC .................. 219/202, 217, 539, 541, 548–553
See application file for complete search history.

(56) References Cited

U.S. PATENT DOCUMENTS

| | | | |
|---|---|---|---|
| 4,697,064 A | 9/1987 | Altmann | |
| 4,946,220 A | 8/1990 | Wyon | |
| 6,486,452 B2 | 11/2002 | Loyd, Sr. | |
| 6,988,770 B2 | 1/2006 | Witchie | |
| 7,183,519 B2 | 2/2007 | Horiyama | |
| 7,457,695 B1 * | 11/2008 | Fields | B60N 2/002 180/271 |
| 7,478,869 B2 | 1/2009 | Lazanja | |
| 7,587,901 B2 | 9/2009 | Petrovski | |
| 8,393,162 B2 | 3/2013 | Chung | |
| 8,397,518 B1 | 3/2013 | Vistakula | |

(Continued)

FOREIGN PATENT DOCUMENTS

| | | | |
|---|---|---|---|
| CA | 2940929 | 3/2017 | |
| DE | 1209026 A2 * | 11/2001 | ............. B60N 2/002 |

(Continued)

OTHER PUBLICATIONS

German to English machine translation of EP 1209026 A2, Published in Nov. 2001.*

(Continued)

*Primary Examiner* — Tu B Hoang
*Assistant Examiner* — Alba T Rosario-Aponte
(74) *Attorney, Agent, or Firm* — Barnes & Thornburg LLP

(57) ABSTRACT

A vehicle seat may include a seat body having a seat base and a backrest arranged to extend upward from the base. The seat body may include an exterior covering. The vehicle seat may further include a comfort system disposed within the seat body and including a heating track configured to emit heat.

18 Claims, 3 Drawing Sheets

(56) References Cited

U.S. PATENT DOCUMENTS

| | | |
|---|---|---|
| 9,676,310 B2 | 6/2017 | Fitzpatrick |
| 10,179,526 B2 | 1/2019 | Marquette |
| 2002/0185483 A1 | 12/2002 | Check |
| 2005/0066505 A1 | 3/2005 | Iqbal |
| 2005/0200166 A1 | 9/2005 | Noh |
| 2006/0130490 A1 | 6/2006 | Petrovski |
| 2006/0175877 A1 | 8/2006 | Alionte |
| 2006/0267260 A1 | 11/2006 | Stowe |
| 2008/0315634 A1 | 12/2008 | Hartmann |
| 2009/0134675 A1 | 5/2009 | Pfahler |
| 2009/0134677 A1 | 5/2009 | Maly |
| 2014/0182063 A1 | 7/2014 | Crawford |
| 2015/0048658 A1 | 2/2015 | Gawade |
| 2016/0039321 A1 | 2/2016 | Dacosta-Mallet |
| 2016/0304013 A1 | 10/2016 | Wolas |
| 2017/0066355 A1 | 3/2017 | Kozlowski |
| 2017/0164757 A1 | 6/2017 | Thomas |
| 2017/0181225 A1 | 6/2017 | Inaba |
| 2017/0232873 A1 | 8/2017 | Hall |
| 2017/0305312 A1 | 10/2017 | Haller |
| 2017/0354190 A1 | 12/2017 | Cauchy |
| 2018/0111527 A1 | 4/2018 | Tait |
| 2018/0272836 A1 | 9/2018 | Humer |
| 2018/0281641 A1 | 10/2018 | Durkee |

FOREIGN PATENT DOCUMENTS

| | | | |
|---|---|---|---|
| JP | 2006021600 | 1/2006 | |
| KR | 1020020062289 A | 7/2002 | |
| KR | 1020070051116 A | 5/2007 | |
| KR | 101154518 B1 | 6/2012 | |
| KR | 20120064814 | 6/2012 | |
| KR | 101565107 | 11/2015 | |
| WO | 2006117690 | 11/2006 | |
| WO | 2007020526 | 2/2007 | |
| WO | 2008023942 | 2/2008 | |
| WO | 2008103742 | 8/2008 | |
| WO | 2015044725 | 4/2015 | |
| WO | 2015085150 | 6/2015 | |
| WO | WO-2015127193 A1 * | 8/2015 | ........... B60N 2/0244 |

OTHER PUBLICATIONS

Machine translation of EP 1209026 performed on Sep. 24, 2020.*
Korean Notice of Preliminary Rejection for Korean App. No. 10-2015-7010107 sent on Jul. 9, 2019, 23 pages.
Office Action dated Oct. 30, 2018 for U.S. Appl. No. 14/820,175 (pp. 1-21).
Office Action dated Sep. 4, 2019 for U.S. Appl. No. 15/787,161 (pp. 1-12).

* cited by examiner

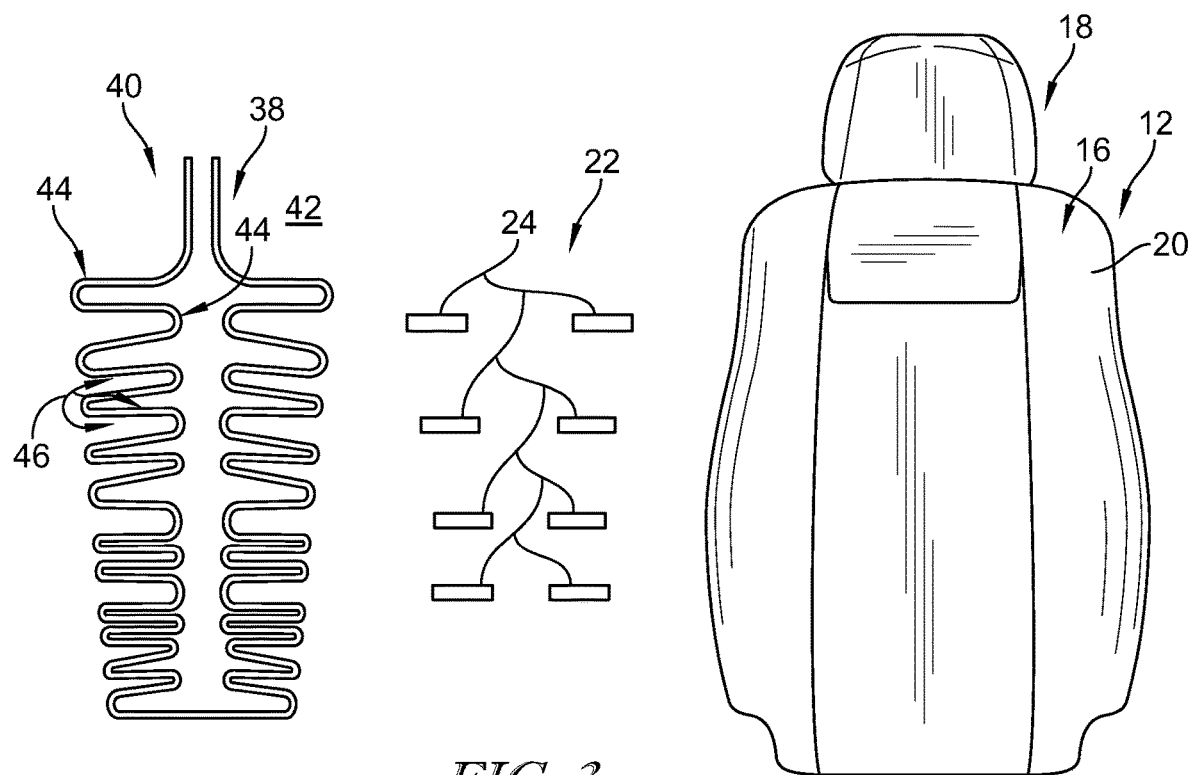
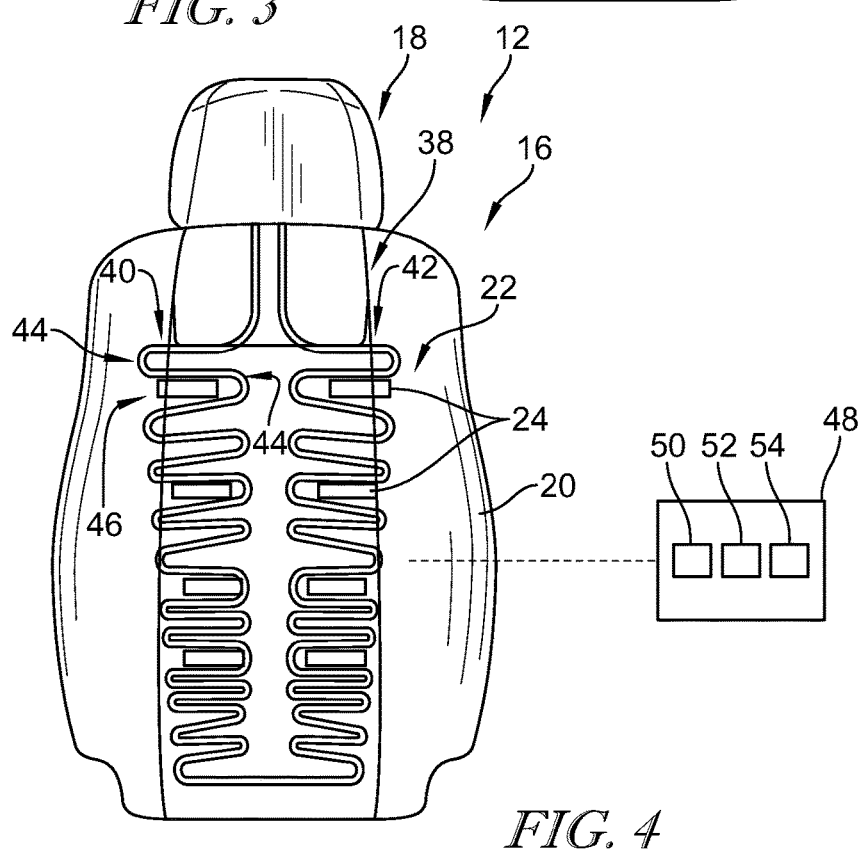

US 11,167,673 B2

VEHICLE SEAT

PRIORITY CLAIM

This application claims priority under 35 U.S.C. § 119(e) to U.S. Provisional Application Ser. No. 62/536,798, filed Jul. 25, 2017, which is expressly incorporated by reference herein.

BACKGROUND

The present disclosure relates generally to vehicle seats, and more particularly, to devices, systems, and methods for vehicle seats having advanced features.

SUMMARY

According to the present disclosure, a vehicle seat may include a seat body having a seat base and a backrest arranged to extend upward from the base. The seat body may include an exterior covering.

In illustrative embodiments, the vehicle seat may further include a comfort system disposed within the seat body and including a heating track configured to emit heat. The heating track may extend in thermal communication with at least a portion of the external covering to provide heating to a user occupying the vehicle seat. The vehicle seat may include a biosensor array disposed within the seat body in communication to detect at least one biophysical parameter of a user occupying the vehicle seat. The heating track and the biosensor array may be together arranged in a layer of the seat body to avoid interference between the heating track and the biosensor array.

In illustrative embodiments, the heating track and the biosensor array may be positioned to avoid contact with each other.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 3 is a exploded front elevation view of portions of the vehicle seat of FIG. 1;

FIG. 4 is a front elevation view of portions of the seat of FIG. 3 partly assembled;

DETAILED DESCRIPTION OF THE DRAWINGS

Vehicle seats may include various features for comfort and/or safety. For example, seats may include heating and/or cooling features, position and/or shape adjustment features, and/or entertainment features. Such features may be provided by systems having components disposed on and/or within the seat itself. As the number and variety of seat features increases, the potential for interference between such features arises.

Figure 1:
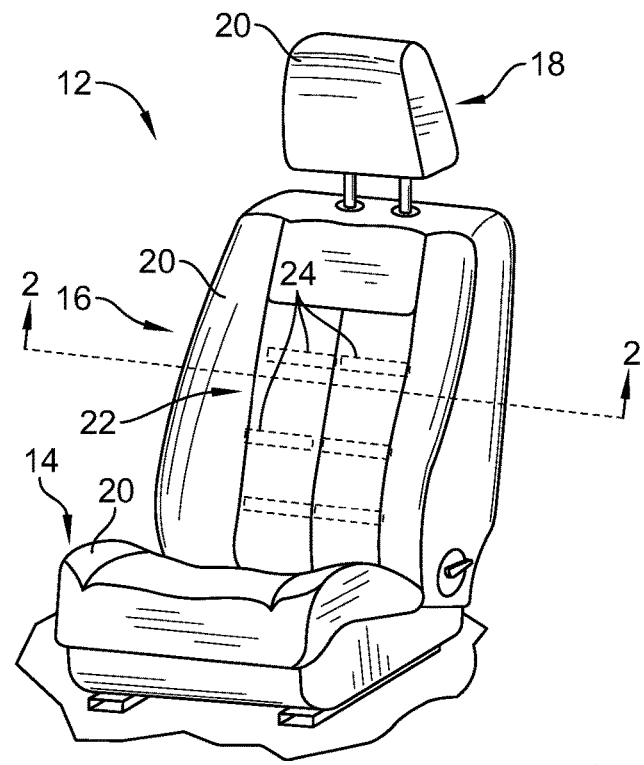
FIG. 1 is a perspective view of a first embodiment of a vehicle seat for use in a vehicle showing that the seat includes a base and a backrest extending from a base for engaging an occupant's body for support in a seated position and showing that a number of sensors are disposed within the seat to detect at least one biophysical parameter of the occupant's body.

An illustrative vehicle seat 12 adapted for use in a vehicle is shown in FIG. 1. The vehicle seat 12 illustratively includes a seat body having a seat base 14 for receiving an occupant's posterior (bottom) and a backrest 16 extending upwardly from the base 14 for receiving the occupant's back. A headrest 18 illustratively extends from the backrest 16, but in some embodiments, may be formed integrally with the backrest 16. Each of the base 14, backrest 16, and headrest 18 illustratively include a cover 20 on the exterior for engagement with the occupant's body. A sensor array 22 having a number of sensors 24 is shown disposed within the backrest 16 for detecting biophysical parameters of the occupant.

Figure 2:
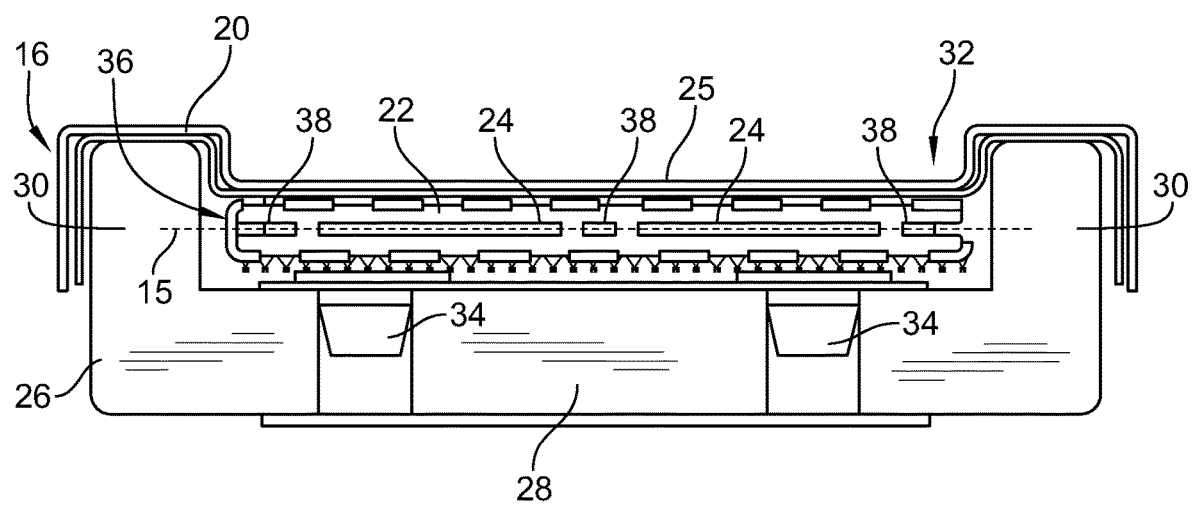
FIG. 2 is sectional view taken along the line 2-2 of FIG. 1.

In FIG. 2, an interior of the backrest 16 is shown. Within the cover 20, the backrest 16 illustratively includes a padding base 26 having a center section 28 and wings 30 on either lateral side which collectively define a resilient concave surface geometry 32 for engagement with the occupant. A pair of ventilation units 34 are illustratively disposed in the base 26 for circulating air to cool the occupant. The sensor array 22 is shown within the cover 20 having its sensors 24 arranged to communicate with an occupant's body to detect biophysical parameters.

In the illustrative embodiment, the sensor array 20, also called biosensor array 20, is shown as being integrated with a pad 36. The pad 36 includes a heating element network 38 arranged for providing heat to the occupant. The sensor array 22 and heating element network 38 collectively define a contact system and are illustratively arranged within the same layer within the backrest 16 to avoid interference with each other. For example, in the illustrative embodiment, the sensor array 22 and heating element network 38 are each arranged within the same imaginary plane 15—however, the flat planar shape is not required and instead the arrangement of the sensor array 22 and heating element network 38 may have equal curvature, such as concave curvature corresponding to the concave surface geometry 32 for engagement with the occupant's body. Thus, the sensor array 22 can be described as coplanar with the heating element network 38 as the sensors 24 are generally coplanar with adjacent portions of the heating element network 38 even if each of the sensor array 22 and heating element network 38 have curvature over their span within the seat. Accordingly, being arranged within the same layer, the sensor array 22 and heating element network 38 each are positioned to have the same depth as each other within the backrest 16 from the surface 25 of the cover 20 defining the concave surface geometry 32 along the surface 25. In some embodiments, the depth of the sensor array 22 and heating element network 38 within the backrest 16 relative to the surface 25 of the cover 20 may vary along the extent of the surface 25.

Referring to FIG. 3, the backrest 12 is shown having the sensor array 22 and heating element network 38, also called a comfort system 38, exploded for descriptive purposes. The heating element network 38 is illustratively embodied as an electrical resistance wire track, also called a heating track, for generating heat under conductance of electrical energy, but in some embodiments, may include any suitable heating arrangement. The heating element network 38 illustratively includes a pair of wire banks 40, 42 corresponding respectively to the occupant's right and left back region. Each bank

40, 42 includes a number of turns 44 creating a serpentinous shaped path and defining cavities 46 between the turns 44.

Referring to FIG. 4, as assembled, the sensor array 22 and heating element network 38 are arranged complimentary within the cover 20 to avoid contact with each other. The sensors 24 of the sensor array 22 are positioned within cavities 46 between some of the turns 22, in other words, the wire is illustratively run such that the sensors 24 are within the cavities 46. The sensors 24 are illustratively positioned horizontally (extending laterally) across the seat 12, but in some embodiments may have any suitable orientation. Accordingly, the heating element network 38 and sensor array 22 are arranged within the same layer of the backrest 16 throughout the backrest 16 in a manner to avoid contacting each other to block against interference.

A controller 48 is arranged in communication with the sensor array 22 for receiving indications of detected biophysical information from the sensors 24. The controller 48 illustratively includes a memory device 50 for storing instructions and/or information, a processor 52 for executing instructions stored on the memory to perform the disclosed functions of the sensor array 22, and communications circuitry 54 for sending and receiving signals as directed by the processor 52.

Just as the arrangement of the contact system has been disclosed relative to the backrest 16, the sensor array 22 and heating element network 38 can equally be included within the seat base 14, and/or within other portions of the seat 12. Namely, the cross-section of the backrest 16 indicated in FIG. 2 can apply equally to describe the seat base 12, and the complimentary arrangement of the sensor array 22 and heating element network 38 indicated in FIGS. 3 and 4 can apply equally to describe their arrangement within the seat base 12 to provide heating and biophysical monitoring to the occupant while blocking against interference. In the illustrative embodiment, the sensor array 22 is formed separately from the heating element network 38, but in some embodiments, the sensor array 22 and heating element network 38 may be formed as an integral unit, for example but without limitation with the pad 36, for installation into the portions of the seat 12.

Figure 5:
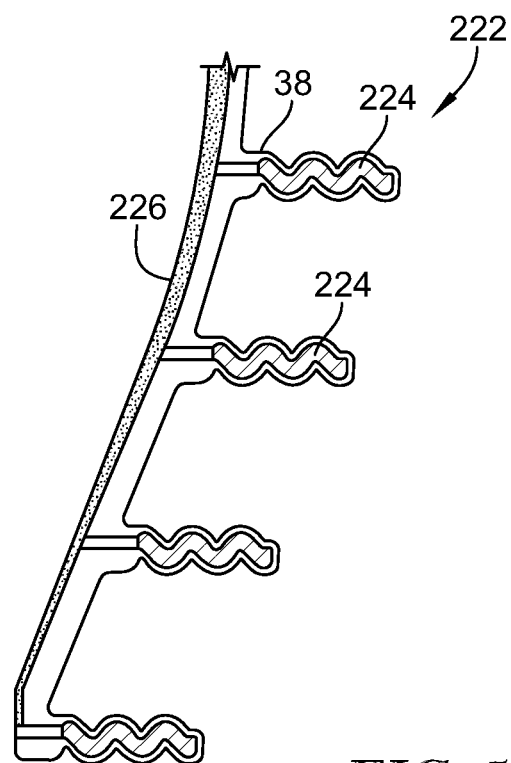
FIG. 5 is a front elevation view of portions of a sensor arrangement for use in the seat of FIGS. 1-4.

Referring now to FIG. 5, another illustrative embodiment of a contact system including a sensor array 222 and heating element network 38 adapted for use in the vehicle seat 12 is shown. The sensor array 222 is similar to the sensor array 22 and the disclosure of sensor array 22 applies equally to the sensor array 222, except in instances of conflict with the specific disclosure of sensor array 222. Thesensor array 222 and heating element network 38 are illustratively arranged within the same layer of the seat 12. The sensors 224 of the sensor array 222 are illustratively formed to have a serpentitious shape and the heating element network 38 near the sensor 24 is arranged to have complimentary shape to the sensor 224.

The sensor array 222 illustratively includes a wire bus 226 extending to communicate each sensor 224 with the controller 48. As shown in FIG. 5, the sensor array 222 is illustratively embodied as a left bank 42 of the array arranged to have a tapering descent for desired positioning along the backrest 16.

Figure 6:
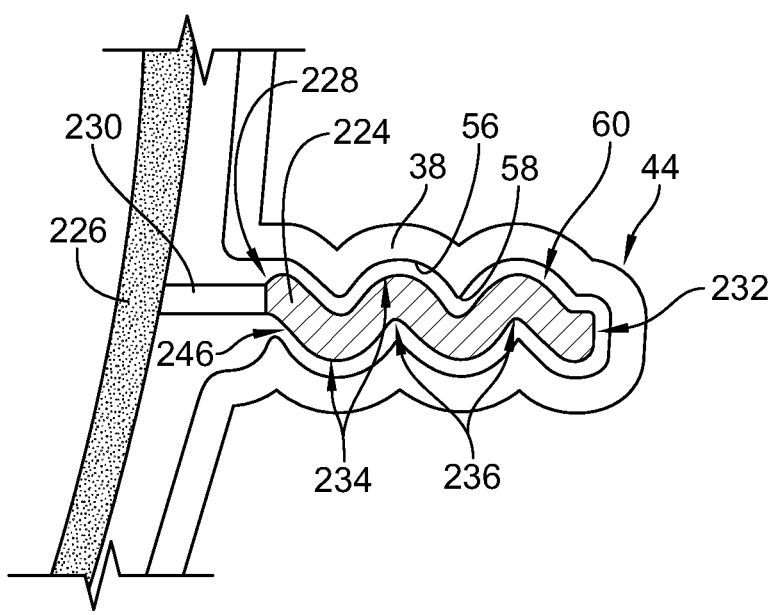
FIG. 6 is an enlarged view of a portion of the sensor array of FIG. 5.

Referring to FIG. 6, each sensor 224 is shown having a first end 228 engaged with a connector 230 in communication with the wire bus 226 and extending from the first end 228 to a second end 232. Between the first and second ends 228, 232, each sensor 224 includes a body defining a serpentitious shape including curves 234 defining valleys 236 therebetween. The heating element network 38 illustrative forms a complimentary shape to the sensor 224 with curves 56 and peaks 58 complimentary to the curves 234 and valleys 236. The heating element network 38 illustratively wraps around the second end 232 of the sensor 224 and forms a complimentary shape to the sensor 224 on both sides (upper and lower in the orientation of FIG. 6).

A gap 60 is defined between the sensor 224 and the heating element network 38 to avoid interference. The gap 60 is illustratively formed to have the same size along the extent of the sensor 224. The gap 60 can provide a heat barrier between the sensor 224 and the heating element network 38. In some embodiments, a heat resistant material may be applied in the gap to prevent transferring heat between the sensor 224 and the heating element network 38.

By arranging sensors and heating elements in the same layer within a vehicle seat in a complimentary manner, interference can be avoided. For example, the heating elements can reach high temperatures, (e.g., within the range of about 90 to about 130° F.). Exposing sensors to heat from the heating elements can degrade and/or deteriorate the sensors and/or sensor function. The present disclosure includes devices, systems, and methods for arranging sensors to detect biophysical parameters of a seat occupant and arranging seat heating elements to provide heat to the seat occupant without requiring undesirable amounts of passage and/or loss of heat energy into the sensors. Biophysical parameters may include temperature, pressure, flow, heat rate, oxygenation, and/or other related factors. In some embodiments, the sensors of the sensor array may include different types of sensors and/or may detect different types of parameters.

By avoiding interference between the sensors and heating elements, the lifespan and function of the sensors can be improved. The sensors often preferably are mounted in close proximity to the occupant's body and namely close to blood vessels of the occupant, for example, just inside and/or on the outer covering of the seat. Heating elements can be desirably arranged close to the occupant in a dense mesh to avoid the perception of cold spots. By arranging the heating element and sensors within the same layer and with complimentary arrangement, each of the heating element and the sensors can have preferred access to the occupant's body without interference. Sensors within the present disclosure may be embodied as biosensors, for example, piezoelectric sensors, but in some embodiments, may include any suitable sensor for detecting biophysical parameters. The devices, systems, and methods within the present disclosure may avoid interference with other advanced features of the vehicle seat such as bladders, vents, massage actuators, entertainment devices, ect.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The following numbered clauses include embodiments that are contemplated and non-limiting:

Clause 1. A vehicle seat of use in a vehicle, the vehicle seat comprising a seat body including a seat base and a backrest arranged to extend upward from the base.

Clause 2. The vehicle seat of clause 1, any other clause, or any combination of clauses, wherein the seat body including an exterior covering.

Clause 3. The vehicle seat of clause 1, any other clause, or any combination of clauses, further comprising a comfort system disposed within the seat body.

Clause 4. The vehicle seat of clause 1, any other clause, or any combination of clauses, wherein the comfort system includes a heating track configured to emit heat, Clause 5. The vehicle seat of clause 1, any other clause, or any combination of clauses, wherein the heating track extends in thermal communication with at least a portion of the external covering to provide heating to a user occupying the vehicle seat Clause 6. The vehicle seat of clause 1, any other clause, or any combination of clauses, further comprising a biosensor array disposed within the seat body in communication to detect at least one biophysical parameter of a user occupying the vehicle seat.

Clause 7. The vehicle seat of clause 1, any other clause, or any combination of clauses, wherein the heating track and the biosensor array are together arranged in a layer of the seat body to avoid interference between the heating track and the biosensor array.

Clause 8. The vehicle seat of clause 1, any other clause, or any combination of clauses, wherein the heating track and the biosensor array are positioned to avoid contact with each other.

Clause 9. The vehicle seat of clause 1, any other clause, or any combination of clauses, wherein the biosensor array includes a plurality of biosensors each arranged coplanar with adjacent portions of the heating track.

Clause 10. The vehicle seat of clause 3, any other clause, or any combination of clauses, wherein the heating track includes at least one section shaped complimentary to at least one of the biosensors.

Clause 11. The vehicle seat of clause 4, any other clause, or any combination of clauses, wherein the at least one biosensor includes a body having a serpentinous shape.

Clause 12. The vehicle seat of clause 4, any other clause, or any combination of clauses, wherein the at least one section of the heating track is closely spaced apart from the body of the at least one biosensor.

Clause 13. The vehicle seat of clause 1, any other clause, or any combination of clauses, wherein the biosensor array and the heating track are integrally formed within a pad.

Clause 14. The vehicle seat of clause 1, any other clause, or any combination of clauses, further comprising a control unit arranged in communication with the biosensor array for receiving an indication of the at least biophysical parameter.

Clause 15. The vehicle seat of clause 1, any other clause, or any combination of clauses, wherein the biosensor array includes at least one piezoelectric sensor.

Clause 16. The vehicle seat of clause 1, any other clause, or any combination of clauses, wherein the heating track includes an electric heating circuit.

Clause 17. The vehicle seat of clause 1, any other clause, or any combination of clauses, wherein the biosensor array communicates through the exterior covering.

Clause 18. A vehicle, comprising a chassis adapted for driven movement, and at least one seat secured with the chassis, the at least one seat including a seat body having a seat base and a backrest arranged to extend upward from the base.

Clause 19. The vehicle of clause 18, any other clause, or any combination of clauses, wherein the seat body includes an exterior covering.

Clause 20. The vehicle of clause 18, any other clause, or any combination of clauses, wherein the at least one seat includes a comfort system disposed within the seat body.

Clause 21. The vehicle of clause 18, any other clause, or any combination of clauses, wherein the comfort system includes a heating track configured to emit heat.

Clause 22. The vehicle of clause 18, any other clause, or any combination of clauses, wherein the heating track extends in thermal communication with at least a portion of the exterior covering to provide heating to a user occupying the vehicle seat.

Clause 23. The vehicle of clause 18, any other clause, or any combination of clauses, further comprising a biosensor array disposed within the seat body in communication to detect at least one biophysical parameter of a user occupying the vehicle seat.

Clause 24. The vehicle of clause 18, any other clause, or any combination of clauses, wherein the heating track and the biosensor array are together arranged in a layer of the seat body to avoid interference between the heating track and the biosensor array.

The invention claimed is:

1. A vehicle seat comprising
   a seat body including a seat base and a backrest arranged to extend upward from the base, the seat body including an exterior covering, the seat base and the backrest meeting at a horizontally extending seat bight line;
   a comfort system disposed within the seat body, the comfort system including a heating track configured to emit heat, the heating track extending in thermal communication with at least a portion of the exterior covering to provide heating to a user occupying the vehicle seat; and
   a biosensor array including a plurality of biosensors and disposed within the seat body in communication to detect at least one biophysical parameter of the user occupying the vehicle seat;
   wherein the heating track and the biosensor array are together arranged within a layer of the seat body to avoid interference between the heating track and the biosensor array,
   wherein the heating track includes at least one wire track formed to include a plurality of turns, the plurality of turns having a plurality of first turns each having a respective center of curvature that is further away from a central axis of the seat body; that extends perpendicularly away from the seat bight line, than a respective first turn and a plurality of second turns each having a respective center of curvature that is closer to the central axis of the seat body than a respective second turn,
   wherein each center of curvature of the plurality of first turns is located between the center of curvature of an adjacent second turn and the central axis, and
   wherein a biosensor of the plurality of biosensors is arranged within a first turn of the plurality of first turns of the at least one wire track of the heating track.

2. The vehicle seat of claim 1, wherein the heating track and the biosensor array are positioned to avoid contact with each other.

3. The vehicle seat of claim 1, wherein each biosensor of the plurality of biosensors is arranged coplanar with adjacent portions of the heating track.

4. The vehicle seat of claim 3, wherein the heating track includes at least one section shaped complimentary to at least one of the biosensors.

5. The vehicle seat of claim 4, wherein the at least one biosensor includes a body having a serpentinous shape.

6. The vehicle seat of claim 4, wherein the at least one section of the heating track is spaced apart from the body of the at least one biosensor.

7. The vehicle seat of claim 1, wherein the biosensor array and the heating track are integrally formed within a pad.

8. The vehicle seat of claim 1, further comprising a control unit arranged in communication with the biosensor array for receiving an indication of the at least biophysical parameter.

9. The vehicle seat of claim 1, wherein the biosensor array includes at least one piezoelectric sensor.

10. The vehicle seat of claim 1, wherein the heating track includes an electric heating circuit.

11. The vehicle seat of claim 1, wherein the biosensor array communicates through the exterior covering.

12. A vehicle, comprising
a chassis adapted for driven movement, and
at least one seat secured with the chassis, the at least one seat including a seat body having a seat base and a backrest arranged to extend upward from the base, the seat body including an exterior covering, the seat base and the backrest meeting at a horizontally extending seat bight line, the at least one seat including a comfort system disposed within the seat body, the comfort system including a heating track configured to emit heat, the heating track extending in thermal communication with at least a portion of the exterior covering to provide heating to a user occupying the vehicle seat, and a biosensor array including a plurality of biosensors and disposed within the seat body in communication to detect at least one biophysical parameter of a user occupying the vehicle seat, wherein the heating track and the biosensor array are together arranged in a layer of the seat body to avoid interference between the heating track and the biosensor array,
wherein the entirety of the heating track includes a single continuous wire track having a first section with a first serpentinous shape and a second section with a second serpentinous shape laterally spaced apart from the first section, the first serpentinous shape being symmetrical to the second serpentinous shape, the first and second serpentinous shapes of the single continuous wire track defining a plurality of cavities formed between turns of the first and second serpentinous shapes,
wherein each respective biosensor of the plurality of biosensors is arranged within a respective cavity of the plurality of cavities of the single continuous wire track of the heating track, and
wherein the single continuous wire track defines an inner heat track area, the single continuous wire track defining a perimeter of the inner heat track area, and wherein the plurality of biosensors are arranged outside of the inner heat track area.

13. The vehicle of claim 12, wherein an inner side of each cavity of the plurality of cavities is spaced apart from the biosensor located within the cavity by a constant distance along an entirety of a longitudinal side of the biosensor.

14. The vehicle of claim 12, wherein:
an inner side of each cavity of the plurality of cavities is spaced apart from each respective biosensor by a varying distance; and
the plurality of biosensors are arranged symmetrically and includes a first group of biosensors arranged within the first section of the wire track and a second group of biosensors arranged within the second section of the wire track, the first and second groups of biosensors being symmetrical with each other.

15. The vehicle seat of claim 1, wherein each biosensor of the plurality of biosensors is arranged the same distance away from a surface of the exterior covering that contacts the occupant as an adjacent portion of the heating track.

16. The vehicle seat of claim 15, wherein the surface of the exterior covering is curved.

17. The vehicle seat of claim 14, wherein the first group of biosensors and the second group of biosensors are symmetrical about a central axis that extends perpendicularly away from the seat bight line.

18. A vehicle, comprising
a chassis adapted for driven movement, and
at least one seat secured with the chassis, the at least one seat including a seat body having a seat base and a backrest arranged to extend upward from the base, the seat body including an exterior covering, the at least one seat including a comfort system disposed within the seat body, the comfort system including a heating track configured to emit heat, the heating track extending in thermal communication with at least a portion of the exterior covering to provide heating to a user occupying the vehicle seat, and a biosensor array including a plurality of biosensors and disposed within the seat body in communication to detect at least one biophysical parameter of a user occupying the vehicle seat, wherein the heating track and the biosensor array are together arranged in a layer of the seat body to avoid interference between the heating track and the biosensor array,
wherein the entirety of the heating track includes a single continuous wire track having a first section with a first serpentinous shape and a second section with a second serpentinous shape laterally spaced apart from the first section, the first serpentinous shape being symmetrical to the second serpentinous shape, the first and second serpentinous shapes of the single continuous wire track defining a plurality of cavities formed between turns of the first and second serpentinous shapes,
wherein each biosensor of the plurality of biosensors includes a serpentinous shape having curves defining valleys therebetween on an outer surface of the biosensor, each respective biosensor being arranged within a respective cavity of the plurality of cavities of the single continuous wire track of the heating track,
wherein the single continuous wire track completely surrounds each biosensor except for a connector end of the biosensor,
wherein each cavity of the plurality of cavities defined by the single continuous wire track includes an inner surface defining a first contour,
wherein the curves and valleys of each biosensor of the plurality of biosensors define a second contour of the outer surface of the biosensor, and
wherein the first contour of the inner surface of each cavity have curves and peaks that identically match the second contour of the outer surface of the respective biosensor.

* * * * *